United States Patent
Kim et al.

(10) Patent No.: US 8,774,514 B2
(45) Date of Patent: Jul. 8, 2014

(54) METHOD OF AND APPARATUS FOR CLASSIFYING IMAGE USING HISTOGRAM ANALYSIS, AND METHOD OF AND APPARATUS FOR RECOGNIZING TEXT IMAGE USING THE HISTOGRAM ANALYSIS

(75) Inventors: Seung-hun Kim, Suwon-si (KR); Tae-hoon Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1163 days.

(21) Appl. No.: 12/715,459

(22) Filed: Mar. 2, 2010

(65) Prior Publication Data

US 2010/0220927 A1    Sep. 2, 2010

(30) Foreign Application Priority Data

Mar. 2, 2009    (KR) ................. 10-2009-0017764

(51) Int. Cl.
*G06K 9/34*    (2006.01)
(52) U.S. Cl.
USPC .......................................... 382/176; 382/171
(58) Field of Classification Search
CPC ................................................. G06K 9/00456
USPC ......... 382/176, 224, 168–172, 182, 183, 185; 358/462
See application file for complete search history.

(56) References Cited

U.S. PATENT DOCUMENTS 5,546,474 A * 8/1996 Zuniga ........................... 382/176
5,883,973 A * 3/1999 Pascovici et al. ............. 382/176
6,625,312 B1 * 9/2003 Nagarajan et al. ............ 382/176
6,694,051 B1 * 2/2004 Yamazoe et al. .............. 382/167
7,903,844 B2 * 3/2011 Satonaga et al. .............. 382/112
2004/0184673 A1 * 9/2004 Watanabe ...................... 382/274
2005/0047659 A1 * 3/2005 Tanaka .......................... 382/170
2005/0196043 A1 * 9/2005 Jung et al. ..................... 382/176
2006/0204093 A1 * 9/2006 Zhou ............................. 382/176
2006/0239550 A1 * 10/2006 Pulsifer ......................... 382/168

FOREIGN PATENT DOCUMENTS

JP    2005-135210 A    5/2005
KR    1020060105930 A    10/2006

OTHER PUBLICATIONS

Cho et al., "Character for Extraction on a Unconstrained Image Using Wavelet Transform and Its Application," Chosun University, Ministry of Information and Communication, Institute of Information Technology Assessment, Republic of Korea, pp. 1-65 (Jun. 30, 2006).

(Continued)

*Primary Examiner* — Yubin Hung
(74) *Attorney, Agent, or Firm* — Drinker Biddle & Reath LLP

(57) ABSTRACT

Methods and apparatuses of classifying an image as either a text image or a non text image are provided. The method includes converting an input image into an image histogram comprising gray levels and a frequency of the gray levels; analyzing the image histogram to determine a characteristic of the image histogram; and classifying the input image as a text image or a non text image based on the characteristic. The characteristic of the image histogram may include the frequency of the gray levels, a number of peaks, a distance between peaks, and a peak width. The image may be split into blocks and a number of edge pixels determined for each block. The blocks with at least a predetermined number of edge pixels may then be classified. The entire image may then be classified based on the number of blocks determined to be a text image.

21 Claims, 23 Drawing Sheets

(56) References Cited

OTHER PUBLICATIONS

Kwon et al., "Adaptive Error Diffusion for Text Enhancement," The Institute of Electronics Engineers of Korea, pp. 9-16 (2006).

Park et al., "Text Region Extraction Using Pattern Histogram of Character-Edge Map in Natural Images," Journal of Korea Academia-Industrial Cooperation Society, vol. 7(6), pp. 1167-1174 (2006).

* cited by examiner

FIG. 4A

```
2005-228081 (2005.09.16)
Zhang. Jian
(Hangzhou, CN)
Li, Wende
(Hangzhou, CN)
The holidays are nearly finishing. How have you been doing? I am doing well everyday. I
was always lying down on my bed and doing nothing for the whole holiday period.
It was really boring. When I checked my body weight at the bathhouse,
I was knocked with surprise.I put on a lot of weight. I made up my mind to reduce weight,
so I am going exercise with Yoonjoo at three o'clock everyday.It is just a brisk walking,
but would help some.I visited my aunt in Soowon during this Seolnal. Then, the road was
really jammed with full of cars. So we were in the car for eight hours just for one way.
I was chatting with relatives whom I saw after a long time. It was really fun, so I felt
lacking when I left for returing to home. Anyway, we left Soowon at four o'clock and
arrived to my house at six o'clock. Luckily the traffic conditions got better while returing.
```

FIG. 5A

| "This without a between Syb "This without a between Syb "This without a between Syb "This without a between Syb | However, as was the case with Soviet president Teaching Multi-Level Classes What is a Multi-level ESL class? In the first half of 2003, the Korean economy suffered its first recession since the 1997 currency crisis. Korea Baseball Organization Current season or competition: Korea Baseball Organization Current season or competition: | The OLED includes a pixel electrode, a counter electrode facing the pixel electroce, and an emission layer including an organic material interposed between the pixel electrode and the counter electrode. Before depositing the organic material, a surface of the pixel electrode (i.e., an anode electrode) is processed depositing the organic using plasma. The plasma-process |
| classified directory Entertainer Sport Artist Politician Public service personnel A Journalist An enterpriser A financier Military personnel Teacher The present invention provides a substrate plasma-processing apparatus for | CROSS-REFERENCE TO RELATED PATENT APPLICATION This application claims the benefit of Korean Patent Application No. 10-2009-0039887, filed on May 7, 2009, in the Korean Intellectual Property Office, the disclosure of which is incorporated herein in its entirety by reference. 1. Field of the Invention The present invention relates to a substrate plasma-processing apparatus. 2. Description of the Related Art An organic light emitting display device using an organic light emitting diode (OLED) has a fast response speed, | with respect to the surface of the has an effect or a light emission efficiency and a lifetime of the OLED. That is, if the surface of the pixel electrode is not uniformly plasma-processed, the brightness of the organic light emitting display cevice is not uniform and also, the lifetime of the organic light emitting display cevice is shortened. Therefore, with respect to plasma-processing the surface of the pixel electrode, plasma uniformity in a plasma-processing apparatus is very important. |

FIG. 5C

| classified directory | CROSS-REFERENCE TO RELATED PATENT |
| Entertainer | APPLICATION |
| Sport | |
| Artist | This application claims the benefit |
| Politician | of Korean Patent Application No. |
| Public service personnel | 10-2009-0039887, filed on May 7, |
| A Journalist | 2009, in the Korean Intellectual Property |
| An enterpriser | Office, the disclosure of which is incorporated |
| A financier | herein in its entirety by reference. |
| Military personnel | |
| Teacher | 1. Field of the Invention |
| However, as was the case with Soviet president | The present invention relates to a substrate |
| Teaching Multi-Level Classes What is a | plasma-processing apparatus. |
| Multi-level ESL class? | 2. Description of the Related Art |
| In the first half of 2003, the Korean | An organic light emitting display device |
| economy suffered its first recession since the | using an organic light emitting diode |
| 1997 currency crisis. | (OLED) has a fast response speed, |

FIG. 5E

| "This without a between Syb "This without a between Syb "This without a between Syb "This without a between Syb | However, as was the case with Soviet president Teaching Multi-Level Classes What is a Multi-level ESL class? In the first half of 2003, the Korean economy suffered its first recession since the | The OLED includes a pixel electrode, a counter electrode facing the pixel electrode, and an emission layer including an organic material interposed between the pixel electro |
|---|---|---|
| classified directory Entertainer Sport Artist Politician Public service personnel A Journalist An enterpriser A financier Military personnel Teacher | 1997 currency crisis. Korea Baseball Organization Current season or competition: Korea Baseball Organization Current season or competition: CROSS-REFERENCE TO RELATED PATENT APPLICATION This application claims the benefit of Korean Patent Application No. | and the counter electrode. depositing the organic surface of the pixel elect an anode electrode) is pr depositing the organic using plasma. The plas with respect to the surface effect on a light emission and a lifetime of the OLED. if the surface of the pixel not uniformly plasma-proc |
| The present invention provides a substrate plasma-processing apparatus for "This without a between Syb "This without a between Syb | 10-2009-0039887, filed on May 7, 2009, in the Korean Intellectual Property Office, the disclosure of which is incorporated herein in its entirety by reference. herein in its entirety by reference. | brightness of the organic display device is not unif the lifetime of the organic display device is shortene with respect to plasma- surface of the pixel electro uniformity in a plasma-pro apparatus is very importa |

FIG. 10A

SUMMARY OF THE INVENTION

The present invention provides a substrate plasma-processing apparatus for constantly maintaining plasma uniformity in a chamber.
According to an aspect of the present invention, there is provided a substrate. According to an aspect of the present invention, there is provided a substrate plasma-processing apparatus for plasma-processing a surface of an electrode formed on a substrate, the substrate plasma-processing apparatus including a chamber having disposed therein the substrate; a first electrode disposed in the chamber apart from a bottom surface of the substrate; a second electrode disposed in the chamber apart from a top surface of the substrate; and a distance adjusting unit adjusting a distance between the first electrode and the substrate or a distance between the second electrode and the substrate.
The distance adjusting unit may adjust the distance between the first electrode and the substrate by raising or lowering the substrate.
The distance adjusting unit may adjust the distance between the second electrode and the substrate by raising or lowering the second electrode
According to another aspect of the present invention, there is provided a substrate plasma-processing apparatus for plasma-processing a surface of an electrode of an organic light emitting display device (an organic light emitting diode the substrate plasma-processing apparatus including a chamber; a distance adjusting unit for supporting and moving a substrate in the chamber; a first electrode disposed below and apart from the The OLED includes a pixel electrode, a counter electrode facing the pixel electrode, and an emission layer including an organic material interposed between the pixel electro and the counter electrode. depositing the organic surface of the pixel elect an anode electrode) is pr depositing the organic using plasma. The plas with respect to the surface effect on a light emission and a lifetime of the OLED if the surface of the pixel not uniformly plasma-proc brightness of the organic display device is not unif the lifetime of the organic display device is shortene with respect to plasma-

FIG. 10B

| SUMMARY OF THE INVENTION | | The OLED includes a pixel electrode, a counter electrode facing the pixel |
|---|---|---|
| The present invention provides a substrate plasma-processing apparatus for constantly maintaining plasma uniformity in a chamber. | | electrode, and an emission layer including an organic material interposed |
| According to an aspect of the present invention, there is provided a substrate. According to an aspect of the present invention, there is provided a substrate plasma-processing apparatus for plasma-processing | | |
| a surface of an electrode formed on a substrate, the substrate plasma-processing apparatus including a chamber having disposed therein the substrate; a first electrode disposed in the chamber apart from a bottom | | between the pixel electro and the counter electrode. depositing the organic |
| surface of the substrate; a second electrode disposed in the chambe r apart from a top surface of the substrate; and a distance adjusting uni. adjusting a distance between the first electrode and the substrate or | | an anode electrode) is pr depositing the organic using plasma. The plas |
| a distance between the second electrode and the substrate. The distance adjusting unit may adjust the distance between the first electrode and the substrate by raising or lowering the substrate. | | with respect to the surface effect on a light emission and a lifetime of the OLED |
| The distance adjusting unit may adjust the distance between the second electrode and the substrate by raising or lowering the second electrode According to another aspect of the present invention, there is provided a | | if the surface of the pixel not uniformly plasma proc brightness of the organic |
| substrate plasma-processing apparatus for plasma-processing a surface of an electrode of an organic light emitting display device (an organic light emitting diode the substrate plasma-processing apparatus including a | | the lifetime of the organic display device is shortene |
| chamber; a distance adjusting unit for supporting and moving a substrate in the chamber; a first electrode disposed below and apart from the | | with respect to plasma- |

| 74  | 574 | 803 | 607 | 512 | 400 | 213 | 124 | 409 | 241 |
| --- | --- | --- | --- | --- | --- | --- | --- | --- | --- |
| 44  | 350 | 721 | 750 | 825 | 648 | 468 | 355 | 750 | 757 |
| 6   | 67  | 542 | 265 | 668 | 534 | 242 | 332 | 780 | 837 |
| 30  | 0   | 791 | 630 | 948 | 814 | 286 | 361 | 748 | 572 |
| 108 | 0   | 568 | 655 | 889 | 751 | 298 | 248 | 649 | 434 |
| 37  | 16  | 684 | 700 | 624 | 735 | 197 | 245 | 747 | 786 |
| 18  | 359 | 574 | 566 | 569 | 592 | 485 | 218 | 763 | 757 |

FIG. 14

| 1 | 0 | 0   | 1   | 0   | 129 | 5   | 1   | 0   | 0   |
|---|---|-----|-----|-----|-----|-----|-----|-----|-----|
| 0 | 0 | 0   | 3   | 70  | 882 | 770 | 617 | 739 | 113 |
| 3 | 1 | 1   | 0   | 3   | 265 | 215 | 336 | 600 | 34  |
| 1 | 0 | 2   | 145 | 96  | 252 | 83  | 1   | 1   | 0   |
| 1 | 0 | 0   | 342 | 249 | 362 | 147 | 1   | 0   | 2   |
| 1 | 0 | 125 | 317 | 334 | 420 | 178 | 67  | 2   | 0   |
| 1 | 0 | 61  | 74  | 301 | 108 | 147 | 25  | 1   | 0   |

METHOD OF AND APPARATUS FOR CLASSIFYING IMAGE USING HISTOGRAM ANALYSIS, AND METHOD OF AND APPARATUS FOR RECOGNIZING TEXT IMAGE USING THE HISTOGRAM ANALYSIS

CROSS-REFERENCE TO RELATED PATENT APPLICATION

This application claims the benefit of Korean Patent Application No. 10-2009-0017764, filed on Mar. 2, 2009, in the Korean Intellectual Property Office, the entire disclosure of which is incorporated herein by reference.

BACKGROUND OF THE INVENTION

1. Field of the Invention

The present invention relates to an image processing, and more particularly, to a method of and apparatus for classifying an image as text image or a non text image.

2. Description of the Related Art

With storage becoming cheaper and cheaper, more and more devices store images. Many applications distinguish between text and non text images. Technologies for accurately determining a non text image from a text image are needed.

SUMMARY OF THE INVENTION

The present invention provides a method and apparatus for classifying an input image simply by analyzing a characteristic of an image histogram.

The present invention also provides a method of and apparatus for recognizing text by analyzing a characteristic of an image histogram, thereby recognizing whether an image itself is a text image.

According to an aspect of the present invention, there is provided a method of classifying an image. The method including converting an input image into an image histogram comprising gray levels and a frequency of the gray levels; analyzing the image histogram to determine a characteristic of the image histogram; and classifying the input image as a text image or a non text image based on the characteristic.

The characteristic of the image histogram may include at least one from the group consisting of the frequency of the gray levels, a number of peaks, a distance between peaks, and a peak width.

The analyzing may further include determining a number of peaks in the image histogram by counting the number of gray levels having a frequency above a predetermined frequency value. Classifying may further include classifying the input image as a text image or a non text image based on the number of peaks.

Analyzing may further include determining a number of intervals between the peaks; and classifying may further include classifying the input image as a text image or a non text image based on the number of intervals.

Analyzing may further include when the number of peaks is two or more, determining whether the distance between the peaks is within a predefined range; and classifying may further include classifying the input image as a text image or a non text image based on whether the distance between peaks is within the predefined range.

Analyzing may further include determining a width of each peak by determining the number of consecutive gray levels having a frequency above the predetermined frequency value; determining whether each width is below a threshold value; and classifying may further include classifying the input image based on whether the width of each peak is below the threshold value.

The predetermined frequency value, the predefined range, and the threshold value may be set according to a type of the input image.

The analyzing may further include normalizing the image histogram.

The type of the input image may include at least one of a text image and a photo image.

An apparatus for classifying an image using histogram analysis is provided. The apparatus including histogram analyzing unit configured to convert an input image into an image histogram comprising gray levels and for each gray level a frequency of the gray level in the input image, and configured to calculate a characteristic of the image histogram; and an image classifying unit configured to classify the input image based on the characteristic.

The characteristic of the image histogram include at least one from the group consisting of the frequency of the gray levels, a number of peaks, a distance between peaks, and a peak width.

The histogram analyzing unit may include a frequency setting unit configured to set the predetermined frequency value to a predetermined value; a peak number determining unit configured to determine a number of peaks by calculating the number of gray levels with a frequency above the predetermined frequency value; a peak distance determining unit configured to set a first threshold range and configured to determine a distance between peaks, and configured to determine whether the distance between the peaks is within the first threshold range; and a peak width determining unit configured to set a second threshold value and configured to determine a peak width for each of the peaks and configured to determine whether the peak width of each of the peaks is below the second threshold and configured to determine a total of the peaks widths and to determine whether the total of the peaks widths is below the second threshold value.

The image classifying unit may classify the input image according to at least one from the group consisting of the number of peaks, the distance between peaks, the peak width of each of the peaks, and the total of the peaks widths.

The predetermined frequency value, the first threshold range and the second threshold may be set according to a type of the input image.

The histogram analyzing unit may further include a normalization unit for normalizing the image histogram.

The type of the input image may include a text image and a photograph image.

A method of recognizing text is provided. The method may include converting an input image into a gray image and detecting pixels including edge components from the gray image; dividing a region of the gray image into a predetermined number of blocks; determining which blocks have a number of edge pixels above a first threshold value; analyzing a characteristic of an image histogram for the gray image for each block having the number of edge pixels above the first threshold value and determining whether the corresponding blocks are text blocks based on the image histogram; and recognizing the input image as a text image based on a number of corresponding blocks determined to be text blocks.

The characteristic of the image histogram may include at least one from the group consisting of a frequency of the gray levels, a number of peaks, a distance between peaks, and a peak width.

Recognizing may further include recognizing the input image as a text image when a ratio of blocks determined to be text blocks to all blocks is above a second threshold value.

Recognizing may further include recognizing the input image as a text image when a value, in which weight indicating dispersion of the text blocks is given to a ratio of blocks determined to be text blocks to all blocks, is above a third threshold value.

Determining whether the blocks are text blocks may include setting a predetermined frequency value to a predetermined value; determining a number of peaks in the image histogram by counting the number of gray levels having a gray level above the predetermined frequency value; when the number of peaks is two or more, determining whether the distance between the peaks is within a predefined fourth threshold range; determining a width of each peak by determining the number of consecutive gray levels having a frequency above the predetermined frequency value; determining whether each peak width is below a fifth threshold value and determining whether a total of all peak widths is below the fifth threshold; and determining the corresponding blocks as texts blocks based on at least one of the group consisting of: the number of peaks, whether the distance between the peaks is within a predefined fourth threshold range, and whether each peak width is below the fifth threshold, and whether the total of all the peak widths is below the fifth threshold.

An apparatus for recognizing text using histogram analysis is provided. The apparatus may include an edge detecting unit configured to detect pixels that are part of edge components from a gray image; a region dividing unit configured to divide a region of the gray image into a predetermined number of blocks; an edge pixel determining unit configured to determine which blocks having a number of edge pixels above a first threshold value; a histogram analyzing unit configured to analyze a characteristic of an image histogram for each block having the number of edge pixels above the first threshold value and configured to determine whether the corresponding blocks are text blocks; and a text recognizing unit for recognizing the input image as a text image or a non text image based on a number of blocks determined to be text blocks.

The characteristic of the image histogram may include at least one from the group consisting of a frequency of the gray levels, a number of peaks, a distance between peaks, and a peak width.

The text recognizing unit recognizes the input image as a text image when a ratio of text blocks determined to be text blocks to all blocks is above a second threshold value.

The text recognizing unit may recognize the input image as a text image when a dispersion of the blocks recognized as text blocks indicates the input image is a text image.

The histogram analyzing unit may include a frequency setting unit configured to set a predetermined frequency value to a predetermined value; a peak number determining unit configured to determine a number of peaks by calculating the number of gray levels with a frequency above the predetermined frequency value; a peak distance determining unit configured to set a third threshold range and configured to determine whether a distance between the peaks is within the first threshold value range; and a peak width determining unit configured to set a fourth threshold value and configured to determine whether a peak width for each peak is below the fourth threshold and a total of the peak widths is below the fourth threshold value; and, an image classifying unit configured to determine that a block is a text block based on at least one from the group consisting of: the number of the peaks, the distance between peaks, the peak width, and the total of the peak widths.

BRIEF DESCRIPTION OF THE DRAWINGS

The above and other features and advantages will become more apparent by describing in detail exemplary embodiments thereof with reference to the attached drawings in which:

FIGS. 4A through 4D are diagrams for illustrating histograms of various images;

FIGS. 5A through 5F are diagrams for illustrating histograms of various images;

FIGS. 10A through 10C illustrate image conversion, according to another embodiment of the present invention;

FIG. 11 is a diagram for explaining an example of an edge pixel determining unit included in the apparatus for recognizing text of FIG. 9;

FIG. 14 is a diagram for explaining an example of an edge pixel determining unit included in the apparatus for recognizing text of FIG. 9;

DETAILED DESCRIPTION OF THE INVENTION

Hereinafter, the present invention will be described more fully with reference to the accompanying drawings, in which exemplary embodiments are shown. In the description, details for understanding operations are described only and other details which may obscure the subject matter may be omitted.

The terms used herein should be understood based on the descriptions made herein.

Figure 1:
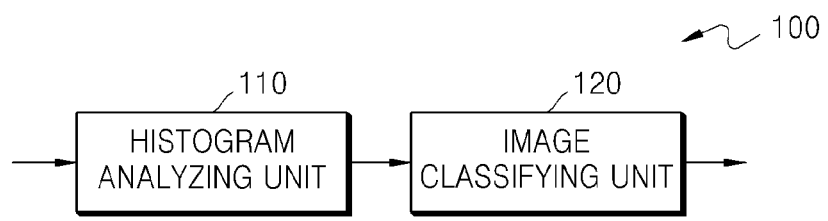
FIG. 1 is a block diagram of an example of an apparatus for classifying an image, according to an embodiment of the present invention.

FIG. 1 is an example of a block diagram of an apparatus 100 for classifying an image.

Referring to FIG. 1, the apparatus 100 for classifying an image includes a histogram analyzing unit 110 and an image classifying unit 120.

Image histograms indicate a distribution of brightness levels for pixels in an image and represent ranges and values of bright pixels and dark pixels when the bright pixels and the dark pixels are distributed. The ranges and values may be represented in a histogram. For example, in a 256 gray level image, the brightness levels are represented in a range from 0 to 255 and the frequency of each brightness level is represented as a height of a bar on the graph.

The histogram analyzing unit 110 receives an image histogram of a gray level image and analyzes characteristics of the image histogram. The characteristics of the image histogram include the frequency of the gray levels of the image histogram, a number of peaks, the distances between peaks, and the widths of peaks. An image histogram may include brightness levels and the frequency of the brightness levels for pixels of an image. The image histogram may indicate the distribution of the brightness levels of the pixels in the image and the range from the brightest pixel to the darkest pixel. For example, the brightness levels may be in a range from 0 to 255 in a 256 gray level image and the frequency of each brightness level is the number of pixels of the image with that brightness, which may be represented as a height of a bar on the graph. The histogram may be analyzed to understand characteristics of the image.

FIGS. 4A through 4D and 5A through 5F are examples of diagrams for illustrating histograms of various images.

Figure 4B:
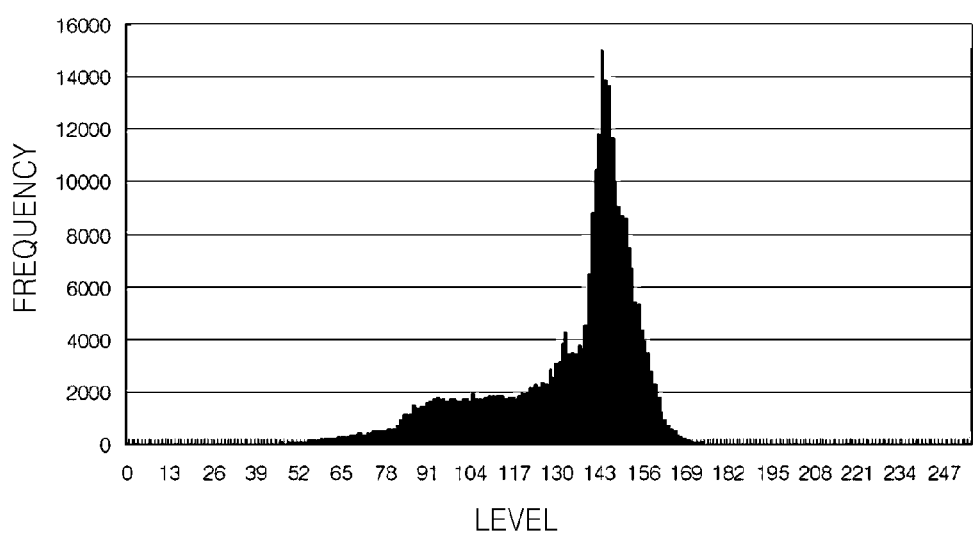
Figures 4C, 4D:
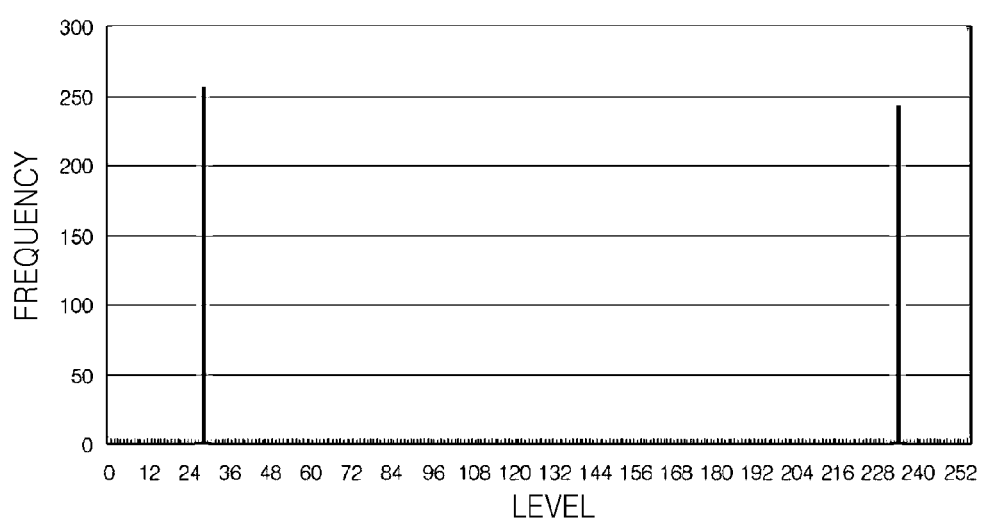

Referring to FIGS. 4A through 4D, examples of text images are illustrated in FIGS. 4A and 4C and histograms for the text images illustrated in FIGS. 4A and 4C are illustrated in FIGS. 4B and 4D, respectively.

As illustrated in FIGS. 4B and 4D, text images may be text printed on a piece of paper or a book and may be on a single-color background. The distribution of the brightness levels for pixels in the text images may have a regular peak value. That is, a peak characteristic of the histogram exists in the test image. Since text is present on a single-color background, according to the characteristics of a text image, intensity levels exist in the image pixels. One to two peaks may exist in a histogram of a text image, however, a general image, for example, a picture image, may have a wider intensity distributions with respect to 256 levels when converted to a gray image.

Figure 5B:
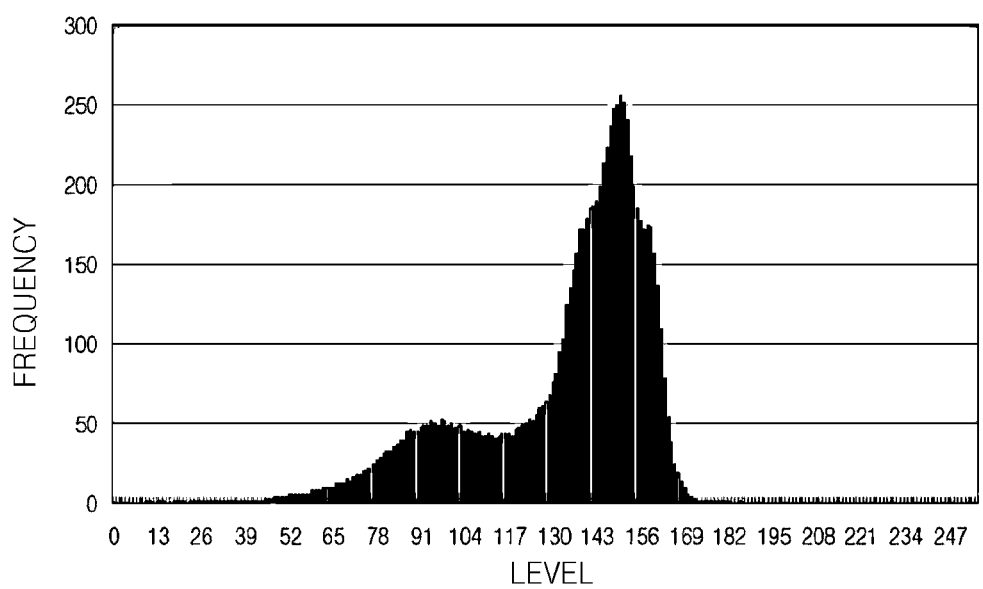
Figure 5D:
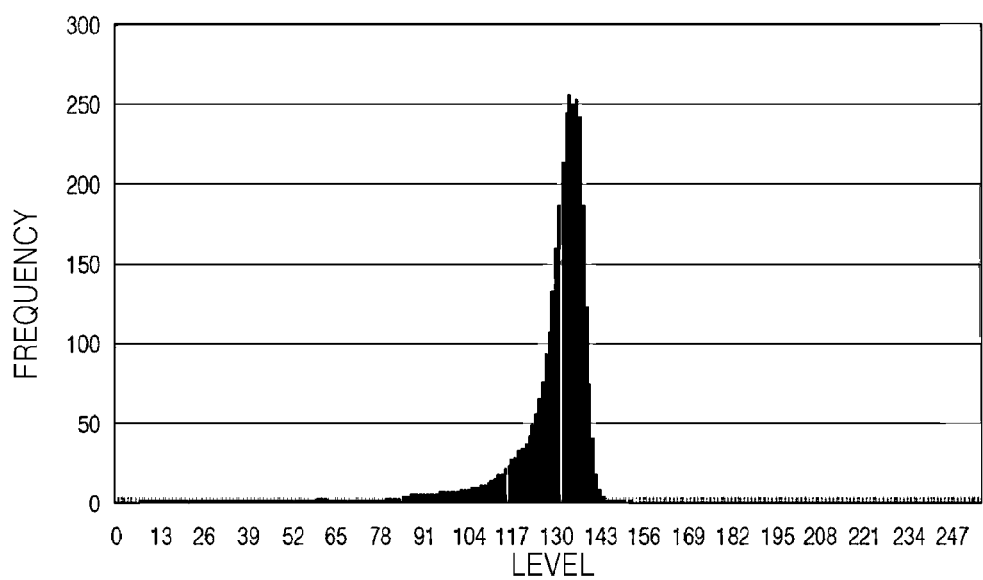
Figure 5F:
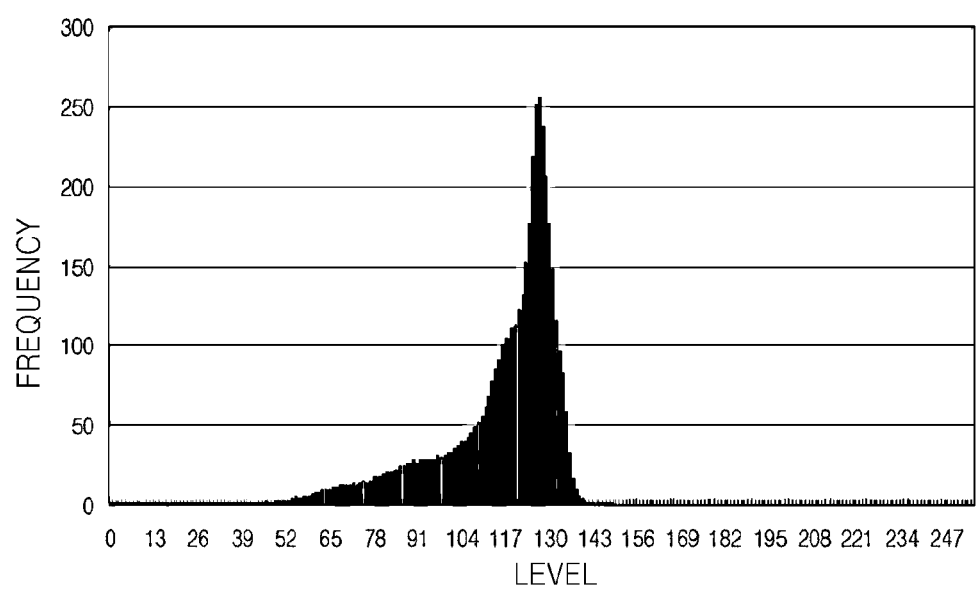

The characteristics of the histograms of the text images described above may be identified in various text images such as illustrated in FIGS. 5A, 5C, and 5E and histograms illustrated in FIGS. 5B, 5D, and 5E of the respective text images illustrated in FIGS. 5A, 5C, and 5E.

The configuration of the histogram analyzing unit 110 will be described in more detail with reference to FIG. 2.

The image classifying unit 120 classifies an input image based on an analysis result obtained by the histogram analyzing unit 110. The image classifying unit 120 classifies whether the input image is a text image according to the characteristics of a histogram corresponding to the input image. The input image may be classified using information such as the number of peaks, the widths of the peaks, and the distances between peaks of the image histogram.

Figure 2:
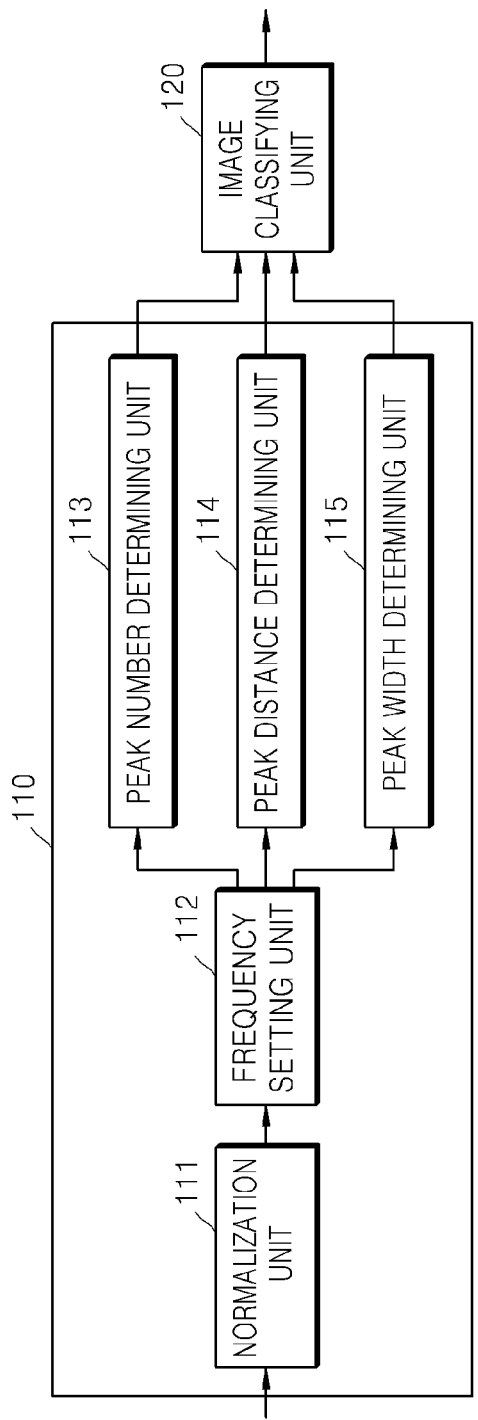
FIG. 2 is a block diagram of an example of a histogram analyzing unit included in the apparatus for classifying an image of FIG. 1.

FIG. 2 is an example of a block diagram of the histogram analyzing unit 110 included in the apparatus 100 for classifying an image of FIG. 1.

Referring to FIG. 2, the histogram analyzing unit 110 includes a normalization unit 111, a frequency setting unit 112, a peak number determining unit 113, a peak distance determining unit 114, and a peak width determining unit 115.

The normalization unit 111 normalizes the image histogram. Here, normalization denotes that when Y values, that is, (the frequency of pixels having the same brightness levels for each brightness level) corresponding to brightness levels in the image, that is, the numbers of pixels (frequencies) corresponding to gray level values exceed a predetermined range, theses values are readjusted to be remapped within the desired predetermined range.

Figure 3A:
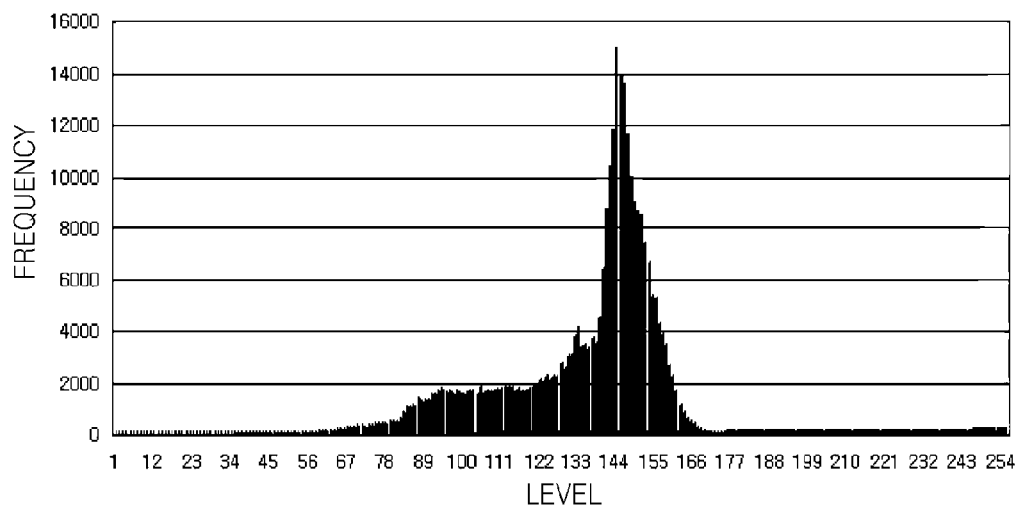
FIGS. 3A and 3B are graphs illustrating histogram normalization.
Figure 3B:
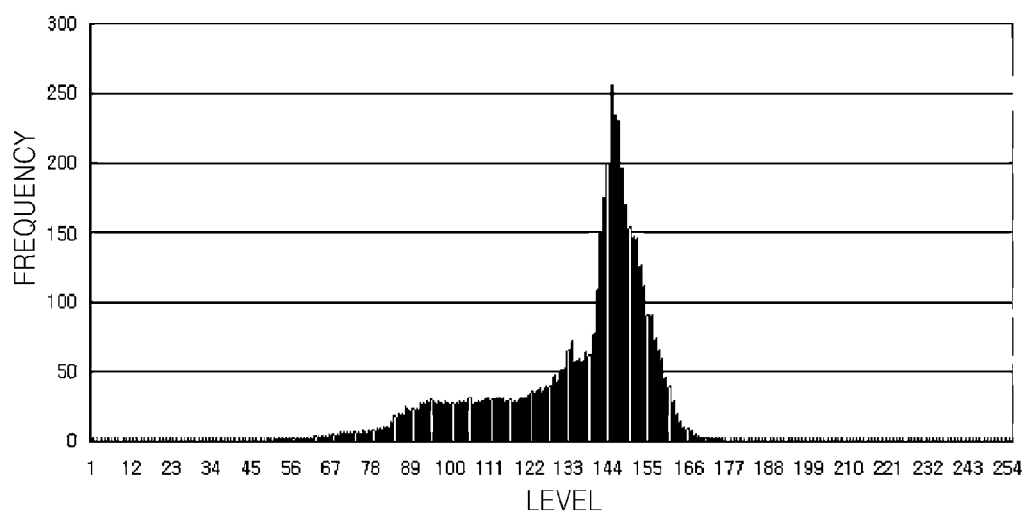

FIGS. 3A and 3B are graphs illustrating examples of histogram normalization.

FIG. 3A is an image histogram and FIG. 3B is a normalized image histogram in which the image histogram of FIG. 3A is normalized. As illustrated in FIG. 3B and compared to FIG. 3A, the Y axis of FIG. 3B, which corresponds to frequency values, is readjusted to values within a desired range.

The frequency setting unit 112 sets a predetermined frequency to indicate the number of gray levels having pixels above the set frequency of an image histogram that are needed to indicate a peak. Here, the predetermined frequency value may be predetermined according to a type of the image, for example, whether an image is a text image or a picture image, and the frequency denotes the number of pixels included in the corresponding gray level.

Figure 6:
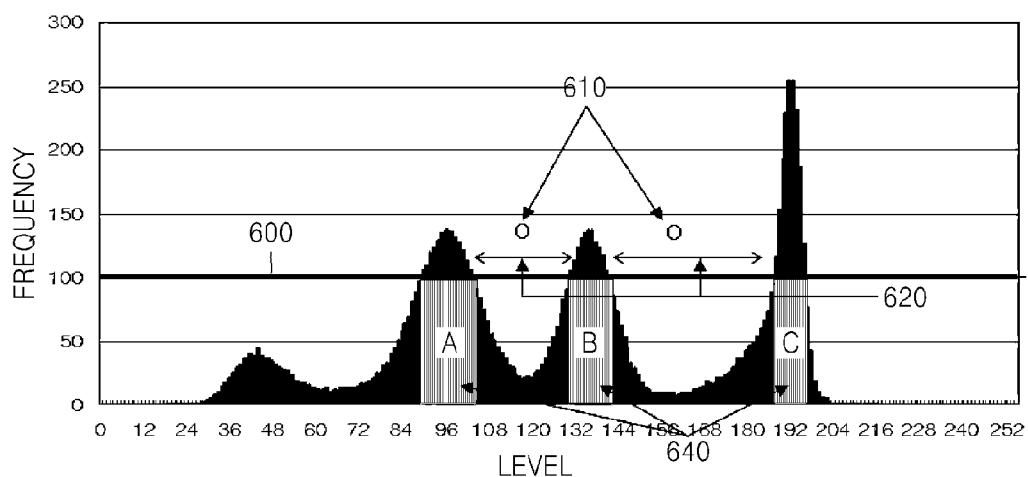
FIG. 6 is a graph illustrating a method of analyzing a histogram, according to another embodiment of the present invention.

FIG. 6 is a graph illustrating a method of analyzing a histogram, according to an embodiment of the present invention.

Referring to FIG. 6, an image histogram of an input image is illustrated. The x-axis indicates gray level and the y-axis indicates normalized frequency.

A line 600 denotes a predetermined frequency for indicating a peak. Here, the predetermined frequency is set to 100. The frequency setting unit 112 may set the predetermined frequency to be different according to a type of the image to be classified.

The peak number determining unit 113 determines the number of intervals between the peaks. The peaks are defined as gray levels with a frequency above the frequency set in the frequency setting unit 112. Referring back to FIG. 6, the intervals 610 between the peaks are illustrated.

When the number of intervals between the peaks is one or more, the peak distance determining unit 114 sets a first threshold value for the distance values between the peaks and determines whether the distance values are above the first threshold value. In FIG. 6, since there are two intervals between the peaks, the first threshold value for the distance values between the peaks, that is, the distance values 620, is set and whether the corresponding distance value 620 is above the first threshold value is determined. Here, the first threshold value may be predetermined.

The peak width determining unit 115 sets a second threshold value for the peak width or the peak widths indicating the number of the gray levels that are above the frequency set in the frequency setting unit 112 and determines whether the peak width or the sum total of the peak widths is below the second threshold value. In FIG. 6, a first peak width A, a second peak width B, and a third peak width C that are above the frequency 100 are illustrated as in reference numeral 640. Then, whether the sum total of the widths, that is, A+B+C, is below the second threshold is determined. Here, the second threshold value may be predetermined.

The image classifying unit 120 may classify the input image according to one or more of the following: existence of the peaks above the frequency set in the frequency setting unit 112, the number of the intervals between the peaks determined in the peak number determining unit 113, whether the distance value determined in the peak distance determining unit 114 are above the first threshold value, and whether the peak width or the sum total of the peak widths determined in the peak width determining unit 115 is below the second threshold value.

Figure 7:
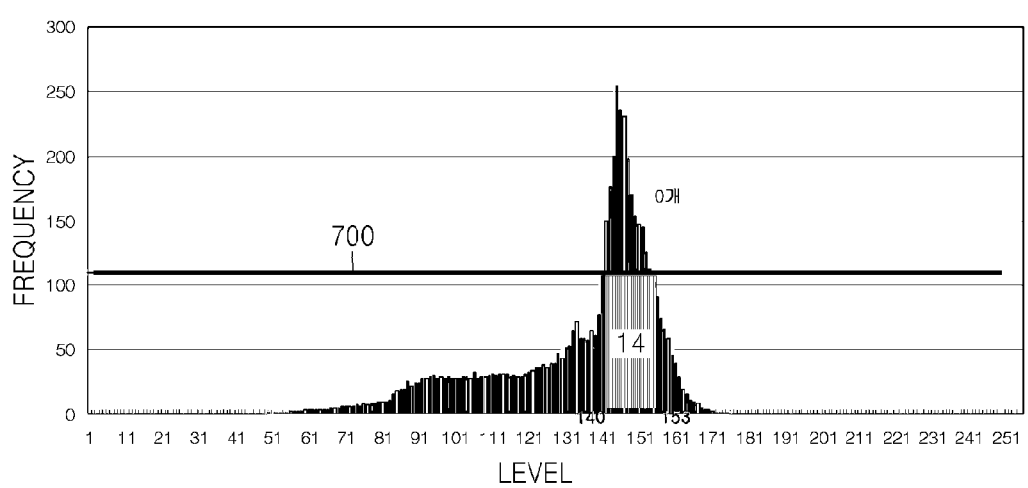
FIG. 7 is a graph illustrating a method of analyzing a histogram, according to another embodiment of the present invention.

FIG. 7 is a graph illustrating an example of a method of analyzing a histogram. Referring to FIG. 7, the method of analyzing the image histogram of the text image illustrated in FIG. 4A, that is, the image histogram in which the image histogram illustrated in FIG. 4B is normalized, is shown.

In FIG. 7, a line 700 denoting the predetermined frequency value is set to 108; the number of the intervals between the peaks is set to 2 or below; the first threshold value, which is a threshold value for the distance values between the peaks, is 4 at the minimum and 128 at the maximum; and the second threshold value, which corresponds to the peak widths that is above the predetermined frequency value, is set to 60 or below.

The number of the peaks that are above the line 700 is 1, and thus the number of the interval between peaks is 0. Thus, the condition of the number of the intervals between the peaks, which is set to 2 or fewer, is satisfied. Also, since the number of intervals between the peaks is 0, the distance values between peaks are not determined. In addition, the peak widths that are above the set frequency of 108 are 14. Thus, the condition of the numbers of the peak widths, which is set to 60, is satisfied. Since all conditions above are satisfied, the input image may be classified as a text image according to the analysis for the characteristic of the image histogram illustrated in FIG. 7.

Figure 8:
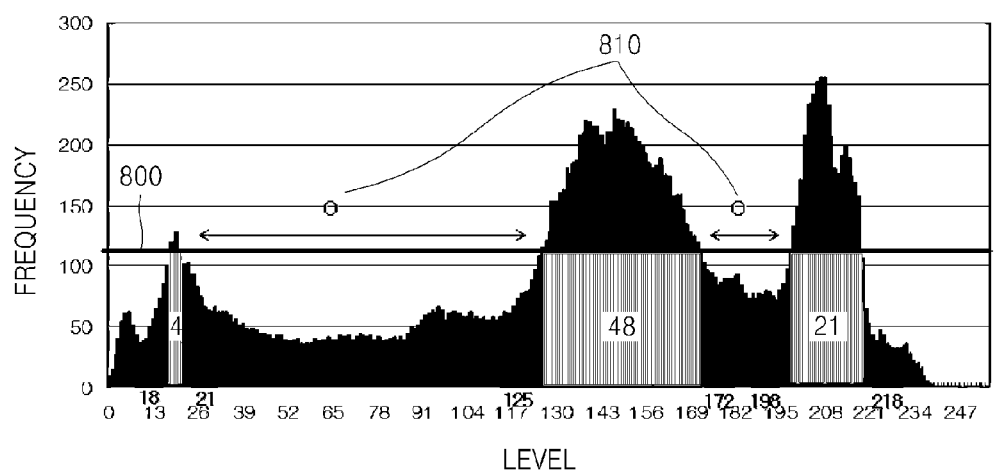
FIG. 8 is a graph illustrating a method of analyzing a histogram, according to another embodiment of the present invention.

FIG. 8 is a graph illustrating an example of a method of analyzing a histogram.

Referring to FIG. 8, a line 800 denoting the predetermined frequency value is set to 108; the number of intervals between the peaks is set to 2 or below; the first threshold value, which is a threshold value for the distance values between the peaks, is 4 at the minimum and 128 at the maximum; and the second threshold value, which corresponds to the peak widths that is above the set frequency, is set to 60 or below in an unknown image histogram. If all these conditions are satisfied in the histogram illustrated in FIG. 8, the input image may be classified as a text image.

The number of the peaks above the line 800, set to a frequency of 108, is 3. Thus, the number of intervals 810 between the peaks is 2 and satisfies the condition thereof. Also, since the distance value between a first peak and a second peak is 105 and the distance value between a second peak and a third peak is 26, the condition of the distance values between the peaks being 4 at the minimum and 128 at the maximum is satisfied. However, with regard to the condition of the peak width or the sum total of the peak widths, the first peak width is 4, the second peak width is 48, and the third peak width is 21. Thus, since the sum total of the peak widths is 73, the condition of the sum total of the peak widths of 60 or below is not satisfied. Thus, the input image is not classified as a text image but as a non text image.

Figure 9:
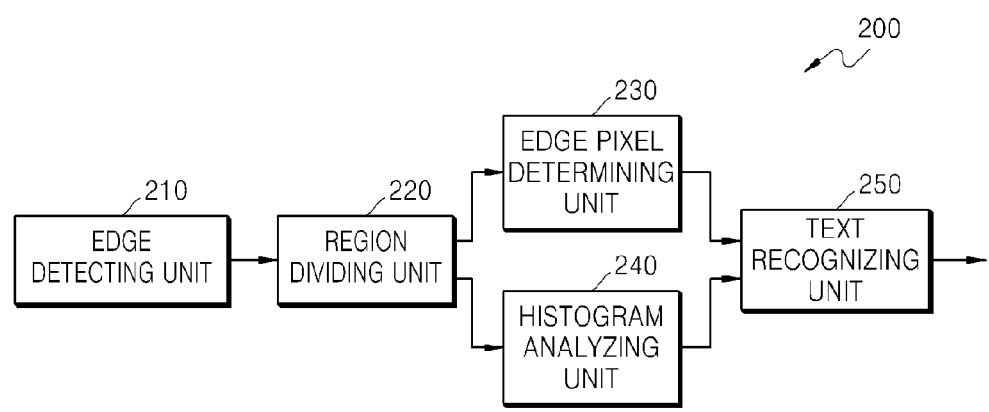
FIG. 9 is a block diagram of an example of an apparatus for recognizing text, according to another embodiment of the present invention.

FIG. 9 is an example of a block diagram of an apparatus 200 for recognizing text according to another embodiment of the present invention.

Referring to FIG. 9, the apparatus 200 for recognizing text includes an edge detecting unit 210, a region dividing unit 220, an edge pixel determining unit 230, a histogram analyzing unit 240, and a text recognizing unit 250.

The edge detecting unit 210 detects pixels including edge components from a gray image. An edge in an image indicates a boundary between regions in the image and discontinuity points in pixel brightness. In other words, there is a brightness difference between an object and a background based on the boundary of the object and the background. Such differences correspond to an outline of an object and provide information about location, shape, and size of an object. Detecting pixels corresponding to edges denotes edge detection wherein an edge is mathematically detected using partial differential operator calculations. The magnitude of a first differential value denotes existence of edges in the image and the sign of a second differential value denotes positions of bright and dark parts of the pixels.

In an embodiment, a 3×3 Laplacian mask is used to detect edge pixels. However, edge pixels may be detected using other differential operator.

The region dividing unit 220 divides a region of the gray image into a predetermined number of blocks. Here, the input image may be divided into blocks having a regular size, for example, a pixel size of 32×32 or 64×64.

Figure 10C:
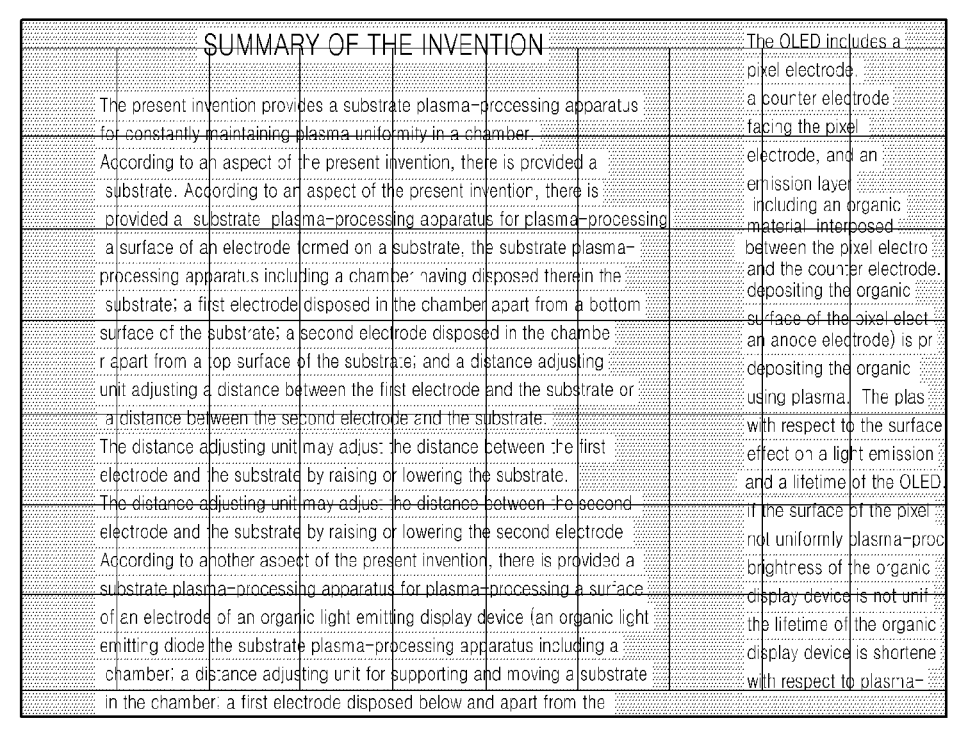

Referring to FIGS. 10A through 10C with regard to edge detection and region division, FIGS. 10A, 10B, and 10C illustrate an original image, edge map blocks generated by dividing a region, and a gray image, respectively. In addition, according to the exemplary embodiment of the present invention, a region is divided after edges are detected. However, the region may be divided and then edges in each edge map block may be detected.

The edge pixel determining unit 230 determines which blocks have a number of edge pixels above a predetermined gray level intensity above a first threshold value from among the detected pixels in each block in the region divided. Whether the input image is a text image is determined according to whether the number of edge pixels above the predetermined gray level intensity with respect to each block in an edge image, for example, above a level 64, is above the first threshold value. For example, when the number of edge pixels above a level 64 is below the first threshold value, the corresponding block is determined to not be a text block even before analyzing the next histogram. When the number of edge pixels is above the first threshold value, the corresponding block may be firstly determined as a text block and thus the next histogram may be analyzed. Here, the first threshold may be arbitrarily determined according to the number of edge pixels in a block. Referring to FIG. 10C and FIG. 11 with regard to determination of edge pixels, the number of edge pixels above a regular level in all edge map blocks (10×7) illustrated in FIG. 10C is illustrated in FIG. 11. It is firstly determined that the blocks that have a number of edge pixels above the first threshold value correspond to text blocks from among all blocks illustrated in FIG. 11, and then next histogram analysis is performed. Accordingly, since the histogram analysis may not be performed for each block that is determined to not be a text block as a result of the determination of edge pixels, the speed of recognizing text in all images may be improved. In the determination of the edge pixels, the background and object have simple brightness and small objects are placed horizontally and vertically in a regular order.

The histogram analyzing unit 240 analyzes the characteristics of the histogram for each block that have a number of the edge pixels above the first threshold value and thus determines whether the corresponding block is a text block. That is, a block having gray levels having frequencies of above n and the distances between the gray levels in a histogram for each block in a binarized edge map are referred to so as to determine whether the blocks are text blocks or tables, that is, text images, or pictures or photographs. The histogram analyzing unit 240 may be performed the same as in histogram analysis as performed by the histogram analyzing unit 110 described above with reference to FIG. 2. However, there is a difference in that the histogram of the entire image is analyzed so as to classify the input image as a text image in FIG.

Figure 12:
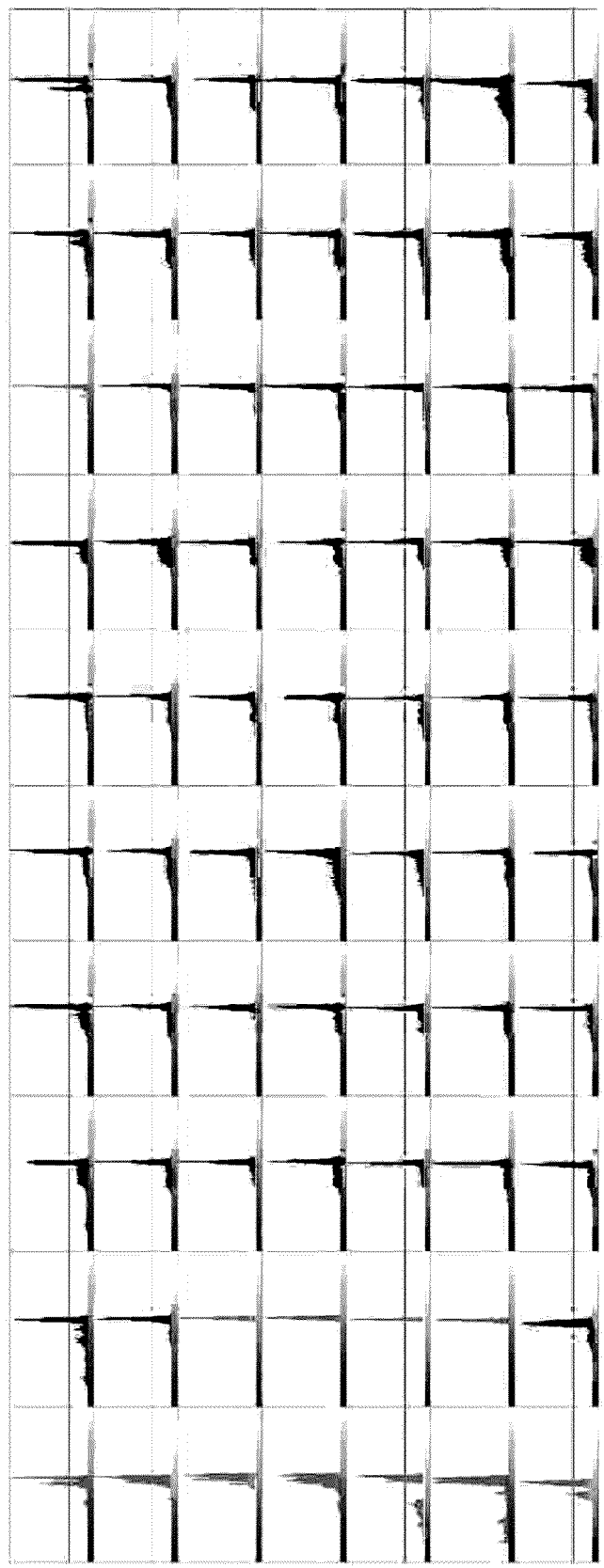
FIG. 12 is a diagram for explaining an example of a histogram analyzing unit included in the apparatus for recognizing text of FIG. 9.

2, whereas whether the respective blocks are text blocks are classified, here. In FIG. 12, histograms for each block of FIG. 10C (10×7) are illustrated. Here, the histograms of all blocks are illustrated. However, as described above, the histograms may only be analyzed for blocks that have a number of edge pixels above a predetermined value above the first threshold value. Referring to FIG. 12, some of the histograms indicated are determined to be text blocks as a result of the analysis through the method of analyzing the histogram described above and some of the histograms are determined to be blocks that are not text blocks. Also, some of the histograms having an insufficient number of edge pixels or blocks to which the histogram analysis cannot be performed.

The text recognizing unit 250 recognizes the input image as a text image based on the result of determination on whether the blocks are text blocks. In addition, the text recognizing unit 250 may give weight to the dispersion of the blocks recognized as text blocks by the histogram analyzing unit 240, that is, how the blocks lump, and may recognize whether the entire image is a text image according to whether the dispersion is above a specific threshold value. In general, letters or tables are written horizontally or vertically and are continuously written in different lines changed in a horizontal or vertical direction. In view of blocks in the edge map, since it is seen that blocks having simple brightness are continued at a frequency component, when the blocks determined as text blocks are adjacent to each other, weight is given and the blocks are distinguished from objects having high frequency instead of text. Here, the specific threshold value may be predetermined as a boundary value for determining whether the input image is a text image.

Figure 15:
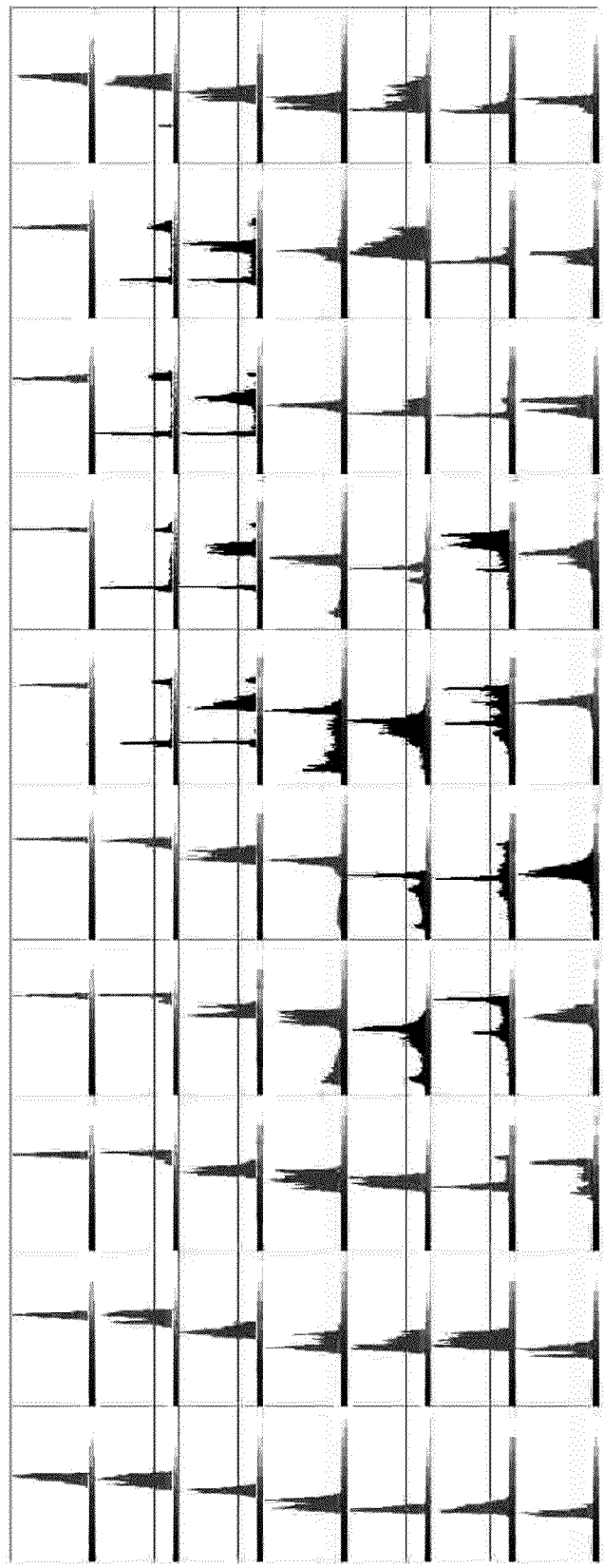
FIG. 15 is a diagram for explaining an example of a histogram analyzing unit included in the apparatus for recognizing text of FIG. 9.

FIGS. 13 through 15 are diagrams for explaining examples of text recognition.

Figure 13A:
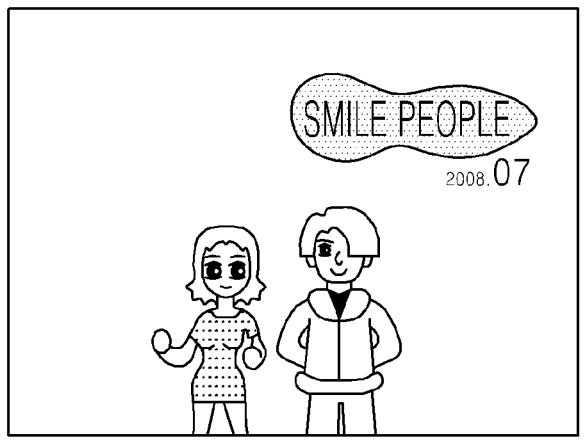
FIGS. 13A through 13C illustrate image conversion according to another embodiment of the present invention.
Figure 13B:
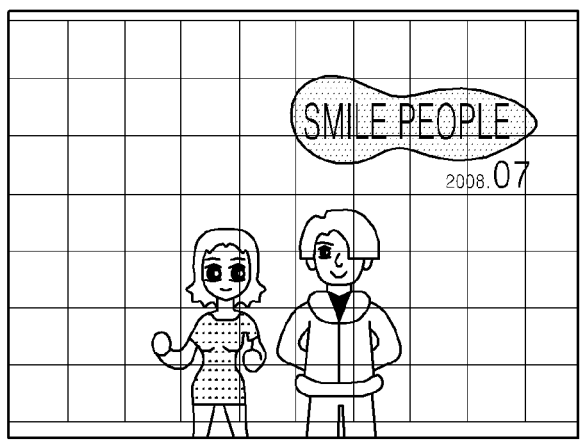
Figure 13C:
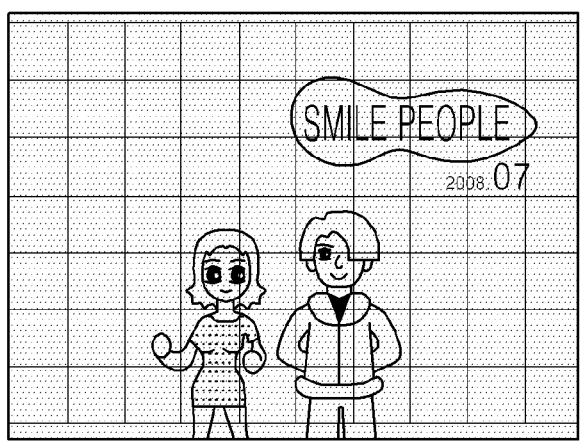

Referring to FIGS. 13A through 13C, an original image, gray image blocks, and edge map blocks are illustrated, respectively.

Referring to FIG. 14, the number of edge pixels for each block in FIG. 13C is illustrated according to each blocks. The apparatus determines whether the number of edge pixels is above a predetermined threshold value in a block and when the number of edge pixels is above the predetermined threshold then the histogram is analyzed for that block.

Referring to FIG. 15, histograms for the corresponding blocks are illustrated. Some blocks are determined to be text blocks and some blocks are determined to be picture blocks, and some blocks are not classified as a text block since the number of edges is insufficient to indicate that the block may be a text block.

Accordingly, as the result of analysis of the histograms illustrated in FIG. 15, the blocks recognized as text blocks are insufficient to determine that the original image is a text image, so the image is classified as a non text image.

Figure 16:
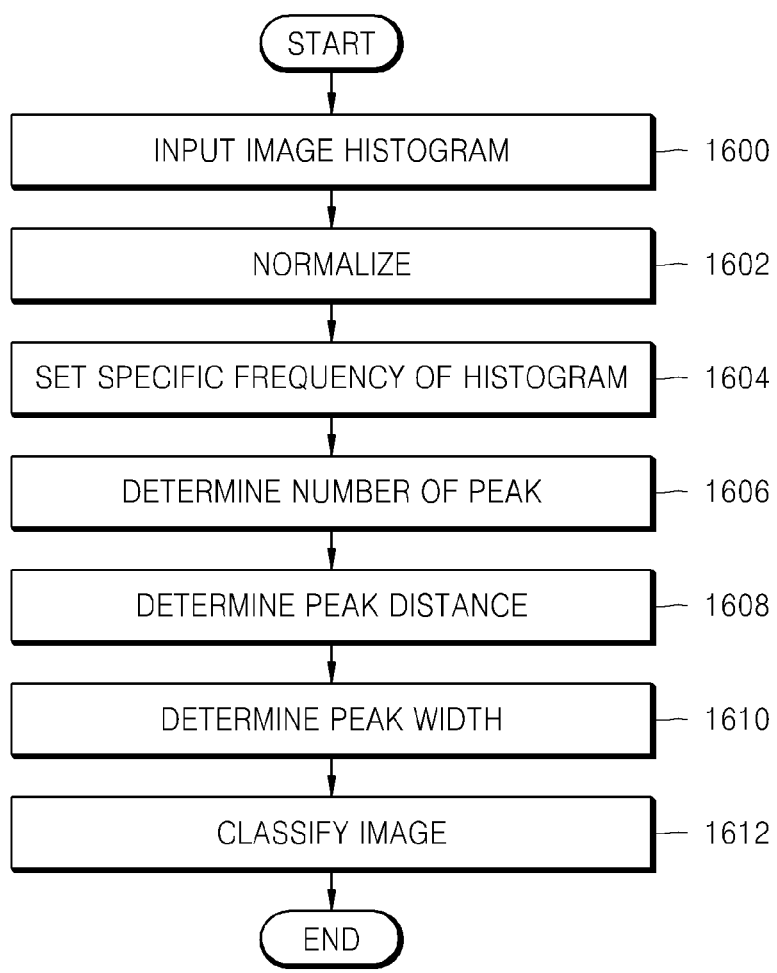
FIG. 16 is a flowchart illustrating an example of a method of classifying an image, according to another embodiment of the present invention.

FIG. 16 is a flowchart illustrating an example of a method of classifying an image according to an embodiment of the present invention.

Referring to FIG. 16, an image histogram is input in operation 1600. Here, the image histogram is a histogram corresponding to a gray level image. In operation 1602, the image histogram is normalized so as to have frequency within a predetermined range. In operation 1604, the specific frequency of the histogram is set. Here, the specific frequency may vary according to the type of input image.

In operation 1606, the number of peak intervals having peaks above the specific frequency is determined. In operation 1608, when the number of peak intervals is above 1, a specific threshold value for the distances between the peak intervals is set and whether the distances are within the range of the threshold value is determined.

In operation 1610, whether the peak width above the frequency set in operation 1604 or the sum total of the peak widths is below the specific threshold value is determined.

In operation 1612, the input image is classified as being a text image or a non text image according to the result of the number of the peaks, the peak distances, and the peak width or the peak widths determined in operations 1606 through 1608.

Figure 17:
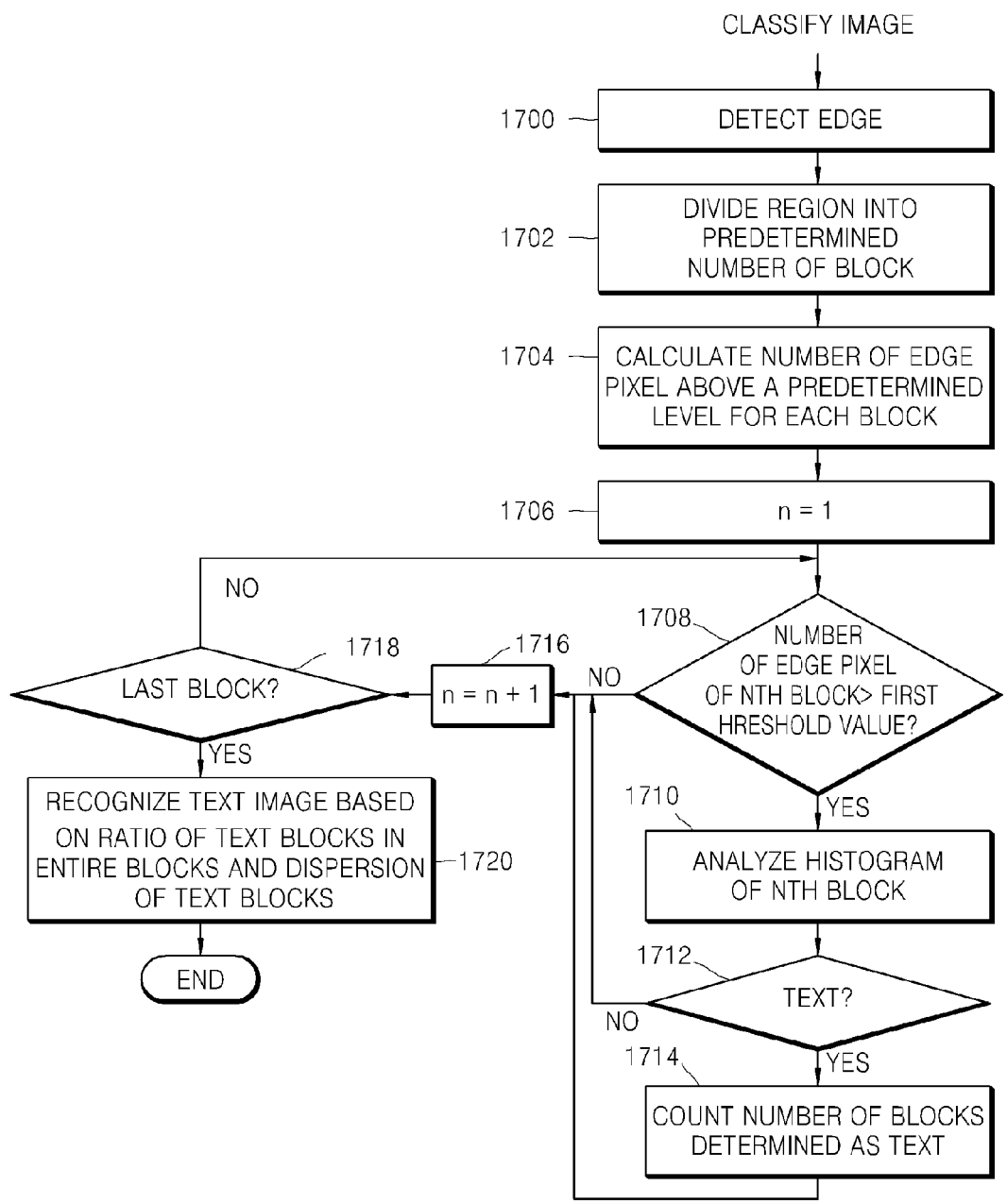
FIG. 17 is a flowchart illustrating an example of a method of recognizing text, according to another embodiment of the present invention.

FIG. 17 is a flowchart illustrating an example of a method of recognizing text according to an embodiment of the present invention.

Referring to FIG. 17, a gray image is input and edge pixels are detected in operation 1700. Here, edge detection may be performed using various differential operators. In operation 1702, a region is divided into a predetermined number of blocks, that is, n blocks. The present embodiment is not limited to the order of the operations 1700 and 1702.

In operation 1704, the number of edge pixels above a predetermined level is calculated for each block. In operation 1706, the number of edge pixels is determined for a first block. In operation 1708, whether the number of edge pixels in the first block is above a first threshold value is determined. As a result of determination in operation 1708, when the number of edge pixels in the first block is above the first threshold value, the histogram of the first block is analyzed in operation 1710. As a result of analysis of the histogram of the first block, when the block is determined to be a text block in operation 1712, the first block is counted as a text block in operation 1714 and then the next block, that is, a second block, is considered in operation 1716.

However, as a result of determination in operation 1708, when the number of edge pixels in the first block is below the first threshold value, the next block, that is, a second block, is considered in operation 1716. When the second block is not the last block in operation 1718, operation 1708 is performed to determine the number of edge pixels and to analyze the histogram for the second block. When determination of the number of edge pixels and histogram analysis are performed for the last block, operation 1720 is performed to determine whether the input image is a text image based on a ratio of text blocks recognized to all blocks, that is, a ratio of the text blocks to all blocks, and dispersion of the text blocks. Here, the dispersion denotes how the text blocks lump.

As described above, when the input image is determined to be a text image using the method of and apparatus for recognizing the text according to the exemplary embodiment, more clear text images may be obtained by edge enhancement, which supplements edge components of the image.

In a method of classifying an image, the characteristics of the image histograms are analyzed and the input image is classified based on the result of analysis, thereby reducing complexity of calculation and processing time for analyzing the characteristics of the image histograms and simply classifying the image.

In a method of recognizing the text, the number of edge pixels existing in the image and histogram characteristic are analyzed so that whether the image is a text image is simply determined without complex calculation.

The invention can be implemented in various image processing devices, for example, digital cameras, camera equipped mobile phones, and digital camcorders.

The invention can also be embodied as computer readable codes on a computer readable recording medium. The computer readable recording medium is any data storage device that can store data that can be thereafter read by a computer system.

Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

The various illustrative units described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of classifying an image, the method comprising:
    converting an input image into an image histogram comprising gray levels and a frequency of the gray levels;
    analyzing the image histogram to determine a characteristic of the image histogram, wherein the characteristic of the image histogram comprises a total width of all peaks in the histogram, and the analyzing comprises:
    setting a predetermined frequency value to a predetermined value;
    determining a number of peaks in the image histogram by counting a number of runs of consecutive gray levels having a frequency above the predetermined frequency value;
    determining a width of each peak by determining a number of consecutive gray levels of each peak having a frequency above the predetermined frequency value;
    determining whether the width of each peak is below a threshold value and determining whether the total width of all the peaks is below the threshold value; and
    classifying the input image as a text image based on whether the total width of all peaks is below the threshold value.

2. The method of claim 1,
    wherein the classifying comprises:
        classifying the input image as a text image or a non text image based on whether the total width of all peaks is below the threshold value and the number of peaks.

3. The method of claim 1, wherein the analyzing further comprises:
    determining a number of intervals between the peaks; and
    wherein the classifying comprises:
        classifying the input image as a text image or a non text image based on whether the total width of all peaks is below the threshold value and the number of intervals.

4. The method of claim 3, wherein the analyzing further comprises:
    when the number of peaks is two or more, determining whether a distance between each pair of adjacent peaks is within a predefined range; and
    wherein the classifying comprises:
        classifying the input image as a text image or a non text image based on whether the total width of all peaks is below the threshold value, the number of intervals, and whether the distance between each pair of adjacent peaks is within the predefined range.

5. The method of claim 4, wherein the predetermined frequency value, the predefined range, and the threshold value are set according to a type of the input image.

6. The method of claim 1, wherein the analyzing further comprises normalizing the image histogram.

7. The method of claim 5, wherein the type of the input image comprises at least one of a text image and a photo image.

8. An apparatus for classifying an image, the apparatus comprising:
    a histogram analyzing unit configured to convert an input image into an image histogram comprising gray levels and for each gray level a frequency of the gray level in the input image, and configured to calculate a characteristic of the image histogram, wherein the characteristic of the image histogram comprises a total width of all peaks in the histogram, and the histogram analyzing unit comprises:
    a frequency setting unit configured to set a predetermined frequency value to a predetermined value;
    a peak number determining unit configured to determine a number of peaks by calculating a number of runs of consecutive gray levels with a frequency above the predetermined frequency value;
    a peak width determining unit configured to set a threshold value, configured to determine a peak width for each peak, configured to determine whether the peak width of each peak is below the threshold value, and configured to determine the total width of all peaks and to determine whether the total width of all peaks is below the threshold value; and
    an image classifying unit configured to classify the input image based on whether the total width of all peaks is below the threshold value.

9. The apparatus of claim 8, wherein the histogram analyzing unit further comprises:
    a peak distance determining unit configured to set a threshold range, configured to determine a distance between each pair of adjacent peaks, and configured to determine whether the distance between each pair of adjacent peaks is within the threshold range.

10. The apparatus of claim 9, wherein the image classifying unit classifies the input image according to the number of peaks, whether the distance between each pair of adjacent peaks is within the threshold range, and whether the total width of all peaks is below the threshold value.

11. The apparatus of claim 10, wherein the predetermined frequency value, the threshold range and the threshold value are set according to a type of the input image.

12. The apparatus of claim 11, wherein the type of the input image comprises a text image and a photograph image.

13. The apparatus of claim 8, wherein the histogram analyzing unit further comprises a normalization unit for normalizing the image histogram.

14. A method of recognizing text using histogram analysis, the method comprising:

converting an input image into a gray image and detecting pixels including edge components from the gray image;

dividing a region of the gray image into a predetermined number of blocks;

determining which blocks have a number of edge pixels above a first threshold value;

analyzing a characteristic of an image histogram of the gray image for each block having the number of edge pixels above the first threshold value, wherein the characteristic of the image histogram comprises a total width of all peaks in the histogram, and the analyzing comprises:

setting a predetermined frequency value to a predetermined value;

determining a number of peaks in the image histogram by counting a number of runs of consecutive gray levels having a frequency above the predetermined frequency value;

determining a width of each peak by determining a number of consecutive gray levels of each peak having a frequency above the predetermined frequency value;

determining whether the width of each peak is below a second threshold value and determining whether the total width of all the peaks is below the second threshold value;

determining whether the corresponding blocks are text blocks based on whether the total width of all peaks is below the second threshold value; and recognizing the input image as a text image based on a number of corresponding blocks determined to be text blocks.

15. The method of claim 14, wherein the recognizing further comprises:

recognizing the input image as a text image when a ratio of blocks determined to be text blocks to all blocks is above a third threshold value.

16. The method of claim 14, wherein the recognizing further comprises:

recognizing the input image as a text image based on a ratio of the determined text blocks to all blocks, and a dispersion of the determined text blocks.

17. The method of claim 14, wherein the analyzing further comprises:

when the number of peaks is two or more, determining whether the distance between each pair of adjacent peaks is within a predefined threshold range; and the determining of whether the corresponding blocks are text blocks comprises determining the corresponding blocks as texts blocks based on whether the distance between each pair of adjacent peaks is within the predefined threshold range and whether the total width of all peaks is below the second threshold value.

18. An apparatus for recognizing text using histogram analysis, the apparatus comprising:

an edge detecting unit configured to detect pixels that are part of edge components from a gray image;

a region dividing unit configured to divide a region of the gray image into a predetermined number of blocks;

an edge pixel determining unit configured to determine which blocks having a number of edge pixels above a first threshold value;

a histogram analyzing unit configured to analyze a characteristic of an image histogram for each block having the number of edge pixels above the first threshold value and configured to determine whether the corresponding blocks are text blocks, wherein the characteristic of the image histogram comprises a total widths of all peaks in the histogram, and the histogram analyzing unit comprises:

a frequency setting unit configured to set a predetermined frequency value to a predetermined value;

a peak number determining unit configured to determine a number of peaks by calculating a number of runs of consecutive gray levels with a frequency above the predetermined frequency value;

a peak width determining unit configured to set a second threshold value, configured to determine a width of each peak, configured to determine whether the width of each peak is below the second threshold value, and configured to determine the total width of all peaks and to determine whether the total width of all peaks is below the second threshold value;

an image classifying unit configured to determine whether a block is a text block based on whether the total width of all peaks is below the second threshold value; and a text recognizing unit configured to recognize the input image as a text image or a non text image based on a number of blocks determined to be text blocks.

19. The apparatus of claim 18, wherein the text recognizing unit recognizes the input image as a text image when a ratio of text blocks determined to be text blocks to all blocks is above a third threshold value.

20. The apparatus of claim 18, wherein the text recognizing unit recognizes the input image as a text image based on a ratio of the determined text blocks to all blocks, and a dispersion of the determined text blocks.

21. The apparatus of claim 18, wherein the histogram analyzing unit further comprises:

a peak distance determining unit configured to set a threshold range and configured to determine whether a distance between each pair of adjacent peaks is within the threshold range; and wherein the image classifying unit is configured to determine that a block is a text block based on whether the distance between each pair of adjacent peaks is within the threshold range and whether the total width of all peaks is below the second threshold value.

* * * * *